United States Patent [19]

Nagasawa et al.

[11] 3,805,124

[45] Apr. 16, 1974

[54] STANNIC OXIDE PHOTOCONDUCTIVE DEVICE FOR DETECTING ULTRAVIOLET LIGHT AND METHOD FOR MAKING THE SAME

[75] Inventors: Masahiro Nagasawa; Hiroyuki Watanabe, both of Osaka, Japan

[73] Assignee: Matsushita Electric Industrial Co. Ltd., Kadoma, Osaka, Japan

[22] Filed: Mar. 22, 1973

[21] Appl. No.: 343,672

[30] Foreign Application Priority Data

| | | |
|---|---|---|
| Mar. 27, 1972 | Japan | 47-4730522 |
| Mar. 27, 1972 | Japan | 47-4730523 |
| Mar. 27, 1972 | Japan | 47-4730524 |
| Mar. 27, 1972 | Japan | 47-4730525 |
| Mar. 27, 1972 | Japan | 47-4730526 |

[52] U.S. Cl. .......... 317/235 R, 317/235 N, 317/237, 317/238, 317/235 AQ, 317/235 AP, 148/186, 250/372

[51] Int. Cl. .......... H01l 15/00

[58] Field of Search..317/235 N, 238, 237, 235 AQ, 317/235 AP; 250/370, 372; 148/186

[56] References Cited

UNITED STATES PATENTS

| | | | |
|---|---|---|---|
| 3,659,157 | 4/1972 | Nogasawa | 317/234 R |
| 3,628,017 | 12/1971 | Lerner | 250/83 CD |
| 3,443,170 | 5/1969 | Pulvari | 317/234 |

*Primary Examiner*—Martin H. Edlow
*Attorney, Agent, or Firm*—Wenderoth, Lind & Ponack

[57] ABSTRACT

This invention provides a stannic oxide photoconductive device for detecting ultraviolet light very efficiently and to a method for making the same. The device has a stannic oxide body with at least two regions, one of which is a conductive region consisting essentially of stannic oxide, and the other of which is a photoconductive laminal region consisting essentially of stannic oxide and an acceptor impurity. Two electrodes are applied to the stannic oxide body, at least one of which is attached to the photoconductive laminal region.

23 Claims, 4 Drawing Figures

STANNIC OXIDE PHOTOCONDUCTIVE DEVICE FOR DETECTING ULTRAVIOLET LIGHT AND METHOD FOR MAKING THE SAME

This invention relates to a stannic oxide photoconductive device for detecting ultraviolet light and to a method for making the same.

Photoconductive devices are well known in the semiconductor art. Such a device of the prior art generally comprises a body of a photoconductive material, such as selenium, cadmium sulfide, cadmium selenide, or lead sulfide, and two ohmic electrodes applied to said body. Most of them are sensitive to visible and/or infrared radiation and are either inefficiently responsive to or insensitive to ultraviolet radiation. For obtaining a photoconductive device which is sensitive to ultraviolet radiation, it is necessary, in principle, to utilize a material having a large energy-band gap.

Stannic oxide ($SnO_2$) is known in the art as a large band-gap semiconductor of the N-type. This material generally has a high electrical conductivity due to its native defects attributable to the non-stoichiometric composition thereof, i.e. oxygen vacancies and/or interstitial tin ions in the crystal lattice. Undoped stannic oxide prepared in an ordinary atmosphere generally has a conductivity of the order of $10^{-2}$ to $10^{2}$ $ohm^{-1}cm^{-1}$. The conductivity of stannic oxide is very sensitive to the presence of a small amount of foreign impurities; a donor impurity such as fluorine and antimony increases the conductivity, while an acceptor impurity such as cadmium, indium and aluminum decreases the conductivity.

It is known in the art that stannic oxide which is highly doped with an acceptor impurity has a very low conductivity (usually less than $10^{-6}$ $ohm^{-1}$ $cm^{-1}$) in the absence of light and exhibits photoconductivity when irradiated with ultraviolet light. However, the photoconductivity of such an acceptor-doped stannic oxide known in the prior art has very poor conductance sensitivity (the definition thereof will be set forth in the following paragraph) and also has poor response speed, and is rather unstable, i.e. the photosensitivity is apt to change permanently because of slight heating or continuous irradiation by light.

In general, the photosensitivity of a photoconductive device is represented by two physical quantities, "conductance ratio" and "conductance sensitivity." The former is defined as the ratio of light-conductance (electrical conductance in the presence of exciting light) to dark-conductance, and the latter as the relative change in electrical conductance per unit intensity of exciting light ($ohm^{-1}$ $watt^{-1}$ $cm^2$). A photoconductive device having a large conductance ratio does not necessarily have a high conductance sensitivity, and vice versa. It is desirable, from the viewpoint of practical use, that a photoconductive device have a large conductance ratio and also a high conductance sensitivity.

A stannic oxide photoconductive device which is useful for detecting ultraviolet light has been proposed as disclosed in U. S. Pat. No. 3,659,157. The device utilizes a stannic oxide body which is heated in high pressure oxygen gas for the purpose of diminishing the oxygen deficiency thereof. While the device of the prior art has an excellent response speed of the order of $10^{-2}$ sec and good stability, it has, at the same time, several features which make practical application and also the manufacturing process thereof difficult, for the following reasons: (1) the conductance sensitivity of such device is rather low (usually, $10^{-1}$ $ohm^{-1}$ $watt^{-1}$ $cm^2$), and therefore, an electrical amplifier is generally needed for practical use; (2) the production method includes a step comprising heat-treatment in a high pressure oxygen atmosphere, which is technically difficult and is expensive; (3) the photoconductive characteristics, especially dark-resistance (electrical resistance in the absence of light), are very sensitive to foreign impurities, especially to antimony, which are apt to be accidentally included in the body of stannic oxide. Because of this, the device of the prior art can be produced with only poor reproducibility.

A primary object of this invention is to provide a stannic oxide photoconductive device having an improved photo-sensitivity.

Another object of this invention is to provide a method for making a stannic oxide photoconductive device having an improved photosensitivity.

Still another object of this invention is to provide a method for making a stannic oxide photoconductive device having an improved reproducibility.

These objects are achieved by providing a photoconductive device comprising a stannic oxide body comprising; at least two regions, one of which is a conductive region consisting essentially of stannic oxide, and the other of which is a photoconductive laminal region consisting essentially of stannic oxide and an acceptor impurity, and two electrodes applied to said stannic oxide body, at least one of which is attached to said photoconductive laminal region. The device has a large conductance ratio and a high conductance sensitivity to ultraviolet light, and can be produced with high reproducibility by a simple manufacturing process.

A method for making a photoconductive device according to this invention comprises; providing a body of conductive stannic oxide; diffusing an acceptor impurity into at least a portion of said body for making a photoconductive laminal region; and applying two electrodes to said body in a manner such that at least one of said two electrodes is attached to said photoconductive laminal region.

Other and further features of this invention will be apparent from the following detailed description taken together with the accompanying drawings, wherein.

Figure 1:
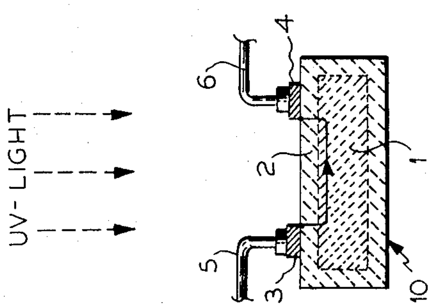
FIG. 1 is a cross-sectional view of one embodiment of a photoconductive device according to this invention.

Referring to FIG. 1, the photoconductive device of this embodiment has a stannic oxide body 10 having a photoconductive laminal region 2 which is so formed as to envelop a conductive region 1. Two electrodes 3 and 4 are applied to the surface of said photoconductive laminal region 2, and they are connected conductively to electrical leads 5 and 6, respectively.

Figure 2:
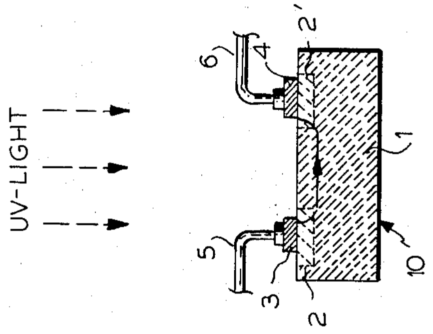
FIG. 2 is a cross-sectional view of another embodiment of a photoconductive device according to this invention.

Referring to FIG. 2, the photoconductive device of this embodiment has a stannic oxide body 10 having a conductive region 1 and two photoconductive laminal regions 2 and 2′ which are separated from each other by a portion of said conductive region 1. Each of said two photoconductive laminal regions 2 and 2′ occupies a portion of the surface layer of said stannic oxide body 10. Two electrodes 3 and 4 are applied to said photoconductive laminal regions 2 and 2′, respectively, and they are connected conductively to electrical leads 5 and 6, respectively.

Figure 3:
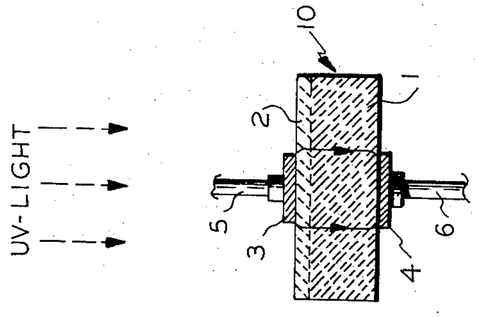
FIG. 3 is a cross-sectional view of still another embodiment of a photoconductive device according to this invention.

Referring to FIG. 3, the photoconductive device of this embodiment has a stannic oxide body 10 having a conductive region 1 and a photoconductive laminal region 2 which is so formed as to occupy the whole of one flat surface of said stannic oxide body 10. One electrode 3 is applied to the surface of said photoconductive laminal region 2. Another electrode 4 is applied to the surface of said conductive region 1. Electrical leads 5 and 6 are connected conductively to said electrodes 3 and 4, respectively.

The electrode attached to said conductive region 1 (such as the electrode 4 in FIG. 3) and the electrode attached to said photoconductive laminal region 2 will be designated as a "type I electrode" and a "type II electrode," respectively, hereinafter.

For detecting ultraviolet light with the device of this invention, a DC or AC voltage is applied to the device through said electrical leads 5 and 6, and the active surface (the surface having the type II electrode) of said stannic oxide body 10 is exposed to ultraviolet light in a manner as schematically shown in FIGS. 1, 2 and 3. By observing the photocurrent flowing through the device by appropriate means such as an ammeter, one can know the intensity of the ultraviolet light.

Figure 4:
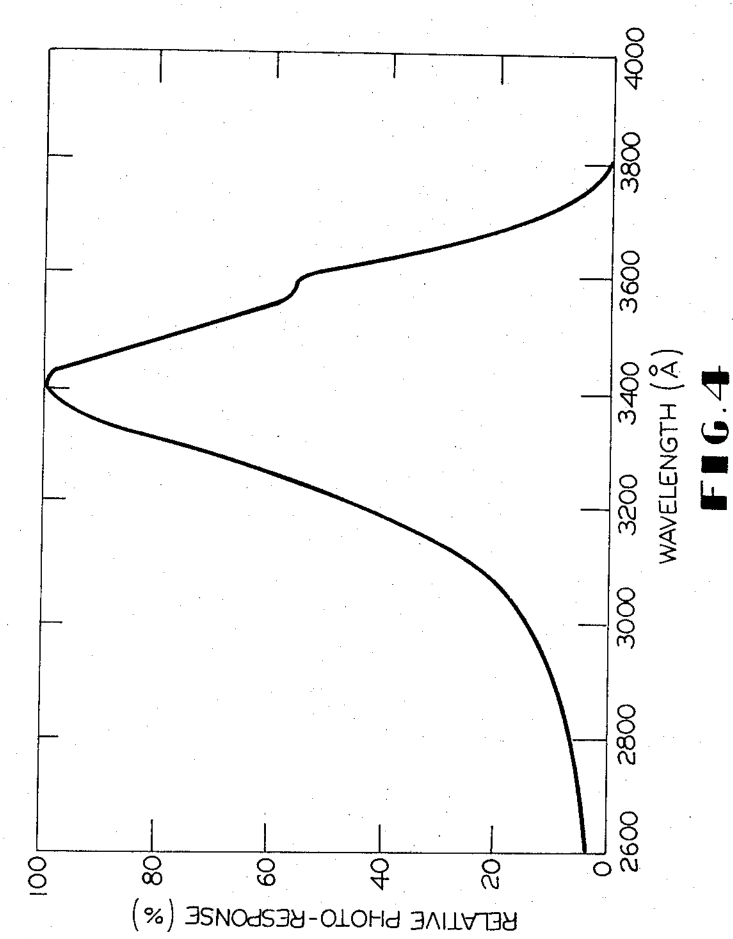
FIG. 4 is a plot of photocurrent vs. wavelength showing the spectral dependence of a photoconductive device according to this invention.

The spectral dependence of the photocurrent of a device according to this invention is shown in FIG. 4. As is apparent therefrom, the device has sensitivity to ultraviolet light having a wavelength shorter than 3,800A. The maximum sensitivity is to light the wavelength of which lies at around 3,400A.

Said stannic oxide body 10 can be in any available form such as a polycrystalline body, a thick film or a single crystal. The best result is obtained by using it in the form of a single crystal.

Said conductive region 1 has N-type conductivity and consists essentially of stannic oxide. It is preferable that the conductivity of said conductive region 1 be more than $10^{-2}$ ohm$^{-1}$ cm$^{-1}$. Although there is, in principle, no upper limit for the operable conductivity, that of more than $10^2$ ohm$^{-1}$ cm$^{-1}$ is not required because the photoconductivity of the device of this invention does not increase significantly with an increase of the conductivity thereof to a conductivity more than $10^2$ ohm$^{-1}$ cm$^{-1}$. It is preferable that said conductive region 1 consist of stannic oxide of high purity (e.g. more than 99.99 percent). The term "high purity" is used here to mean that the quantity of foreign impurities included in the material is extremely small, e.g., less than 0.01 percent); it does not refer to the native defects which give the material N-type electrical conductivity. Stannic oxide doped with a small amount of donor impurities such as antimony is also usable as said conductive region 1. In this case, however, the concentration of the donor impurity is preferably less than 0.1 atomic percent. A higher concentration of the donor impurity has a tendency to degrade the photosensitivity of the resultant device.

Said photoconductive laminal region 2 consists essentially of stannic oxide and an acceptor impurity, and is photoconductive; i.e., it has a very low conductivity in the absence of light, and becomes conductive when irradiated by light having a suitable wavelength. Said photoconductive laminal region 2 has at least one open surface provided for the application of the electrode (type-II). Said acceptor impurity can be aluminum, gallium, cadmium or indium. The best result is obtained by using aluminum.

The thickness of said photoconductive laminal region 2 is preferably less than 200 microns. A device having a photoconductive laminal region thicker than 200 microns has rather poor conductance sensitivity. The conductance sensitivity is higher for a device having a thinner photoconductive laminal region. However, a device having an extremely thin photoconductive laminal region, e.g., thinner than about 1 micron) has a tendency to show unstable photoconductivity and can be made only with relatively poor reproducibility.

One of said two electrodes 3 and 4 must be attached to said photoconductive laminal region 2, i.e. it must be a type II electrode. The other electrode may be attached either to said photoconductive laminal region 2 (type-II) or to said conductive region 1 (type-I). The contact between said electrodes and said stannic oxide body 10 is required to be ohmic or nearly ohmic for obtaining high conductance sensitivity. Said conductive region 1 has a large number of conduction electrons which play a role of a diminishing the effect of contact barrier, and therefore, it forms an ohmic or nearly ohmic contact with most electrode materials known in the art. Any suitable electrode materials such as metals, alloys, and conductive paste, can be used for the type I electrode. The electrode materials which will form an ohmic or nearly ohmic contact with said photoconductive laminal region 2 are aluminum, titanium, indium, tin, nickel, chromium and an alloy of indium and gallium. Another ohmic electrode material is conductive stannic oxide film well known in the art as a transparent electrode material. A device having a type II electrode consisting of aluminum has the best conductance sensitivity. A device having a type II electrode consisting of tin has an excellent conductance sensitivity and the best stability, i.e., aging degradation of the photosensitivity is quite small. A device having a type II electrode consisting of chromium has an excellent conductance sensitivity and stability, and can be produced with the best reproducibility.

Said stannic oxide body 10 can be prepared, for example, in the following way. A body of conductive stannic oxide of high purity is prepared by any available and suitable method such as by using a vapor reaction between high purity stannic chloride ($SnCl_4$) and water in a furnace heated at an elevated temperature. Said conductive stannic oxide body is, if necessary, sliced and polished into a slab by using any suitable method. An acceptor impurity, for example, aluminum, is diffused into the surface layer of said slab for making a photoconductive laminal region. The inner portion of said slab remains undoped and conductive, and acts as the conductive region of the device of this invention. A preferred method for said diffusing step is to heat said conductive stannic oxide slab with the oxide of an acceptor metal, such as aluminum oxide, as the source of the dopant to be diffused into the body; for example, said stannic oxide slab is placed on a plate of alumina ceramic or is buried in fine alumina powder, and heated at an elevated temperature. The heating temperature is preferably in a range from 1,100° to 1,400°C. Active penetration of an acceptor impurity into the crystal lattice of stannic oxide occurs only at temperatures between 1,100°C and 1,400°C. A temperature higher than 1,400°C is not usable, since dissociation reaction of stannic oxide into stannous oxide and oxygen occurs actively at above this temperature. Said source of dopant to be diffused can be a mixture of stannic oxide and an oxide of an acceptor metal; for example, it can be a mixture of finely powdered stannic oxide and aluminum oxide, or a compressed body thereof. Such a source is especially effective when indium or cadmium is used as a doping impurity. Stannic oxide in said mixture plays the role of suppressing rapid vaporization of the volatile dopant, indium oxide or cadmium oxide, at an elevated temperature. Thickness of the photoconductive laminal region can be controlled by controlling the diffusing conditions such as the quantity of the dopant, heating temperature, and heating period. Said thickness can be measured by any suitable method, for example, by grinding, little by little, the surface of the photoconductive laminal region by using a suitable abrasive, and observing the change in surface resistivity.

Said two electrodes 3 and 4 can be applied by any suitable and available method, such as vacuum deposition of metal, metal-plating, metal-spraying, painting of electrically conductive paste, or application of a liquid alloy. In general, the electrical and mechanical properties of said two electrodes, especially of type II electrode, are seriously degraded by contaminants on the contact region of the surface. Said contaminants, if such exist, must be removed from said contact region prior to applying electrodes, by any suitable method such as chemical cleaning and/or ion bombarding. It is preferred that said electrodes be formed in an evacuated chamber by using, for example, a method of vacuum evaporation of metal for the purpose of preventing further contamination.

Electrical properties (contact noise and contact resistance) of the contact between tin or chromium electrode and the photoconductive laminal region can be materially improved by a heat-treatment at any suitable step after the formation of said electrode. The heating temperature is preferably in a range from 150° to 230°C for 8 tin electrode, and from 150° to 250°C for a chromium electrode. Said heat-treatment can be carried out in air or in an inert gas atmosphere. A reducing gas atmosphere and a vacuum must be provided, since they have a tendency to increase the dark-conductivity, and therefore, to decrease the conductance ratio of the resultant device.

The adhesion strength of the electrode material with respect to the stannic oxide body affects the reproducibility and reliability of the device of this invention. Among the electrode materials usable for this invention, vacuum-deposited chromium has the best adhesion strength. The adhesion strength further increases when chromium is deposited on the surface of a stannic body which is heated at above 50°C in a vacuum. Although the adhesion strength increases as the temperature increases, the conductance ratio of the resultant device is generally poor when said body is heated to above 150°C.

Said leads 5 and 6 are connected conductively to the respective electrodes 3 and 4 by any available and suitable method such as soldering or welding, or by using electrically conductive adhesive paste. A spring lead made of a suitable metal such as phosphorous bronze or an alloy of platinum and iridium is also usable.

A device according to this invention has at least one photoconductive laminal region having very low dark-conductivity, a conductive region having high conductivity, and two ohmic electrodes having small contact resistance. The conductivity of said photoconductive laminal region is typically on the order of $10^{-8}$ ohm$^{-1}$ cm$^{-1}$ in the absence of ultraviolet light, and it increases steeply when irradiated by ultraviolet light having a wavelength in a range from 3,000 to 3,800A. The light-conductivity of said photoconductive laminal region is typically on the order of $10^{-5}$ ohm$^{-1}$ cm$^{-1}$ when irradiated by ultraviolet light having an intensity on the order of $10^{-4}$ watt cm$^{-2}$. Since the conductivity of said conductive region of the device of this invention is much higher than the light-conductivity of said photoconductive laminal region, the photo-current due to the photocarriers generated in said photoconductive laminal region has a tendency to flow by way of said conductive region. The situation is shown schematically by solid arrows in FIGS. 1, 2, and 3 for the three types of the device according to this invention. As a result of this flow pattern of the photo-current, and of the fact that the conductivity of the conductive region is much higher than the light-conductivity of the photoconductive laminal region, the electric field applied to the device of this invention is highly concentrated in the photoconductive laminal region. Because of this, the device of this invention has a very high conductance sensitivity.

The depth to which the impurity is diffused into the stannic oxide to make it effective for photoconductivity under ultraviolet light is about 200 microns. A device having the photoconductive laminal region with a thickness greater than said depth has rather poor conductance sensitivity and it has very high resistivity even if exposed to relatively intense ultraviolet light. Conductance sensitivity is generally higher for a device having a thinner photoconductive laminal region. However, a device having an extremely thin photoconductive laminal region has a tendency to show rather large sensitivity change after aging. This may be attributed to unstable surface phenomena which are relatively important for the photoelectric phenomena in such a device.

As described beforehand, an acceptor-doped stannic oxide photoconductor of the prior art is rather unstable. This instability is mainly due to the fact that the surface state of the acceptor-doped stannic oxide is apt to change permanently under the influence of ambient atmosphere, and the fact that the photo-current in said photoconductor of the prior art flows mainly by way of said unstable surface. In the device of this invention, the photo-current flows mainly through the bulk of the stannic oxide body, as described above. Because of this, the device of this invention is quite stable with respect to ambient atmosphere.

Said stability of the device of this invention can be further improved by heating said body of stannic oxide which has been subjected to the diffusing step in high pressure oxygen atmosphere prior to said step of applying electrodes. Said oxidizing step reduces the amount of native defects in said stannic oxide body, and decreases the activity of the surface of the photoconductive laminal region with respect to ambient atmosphere. The heating temperature is preferably in the range from 1,200° to 1,400°C. A temperature lower than 1,200°C is not effective for the improvement described above. A temperature higher than 1,400°C is apt to damage the photoconductive laminal region of said body by causing a dissociation reaction of stannic oxide into stannous oxide and oxygen. An oxygen pressure as low as 2 kg/cm$^2$ is effective, and higher pressure brings about better results. It is important that said oxidizing step be carried out after the completion of said diffusing step. No improvement can be achieved when said diffusing step is carried out in a high pressure oxygen atmosphere.

The device of this invention has very high conductance sensitivity, typically on the order of 1 ohm$^{-1}$ watt$^{-1}$ cm$^2$. The value is about 10 times as large as those obtained by the prior art. The device of this invention is relatively insensitive to foreign impurities, and, therefore, can be manufactured with high reproducibility.

The device of this invention is totally insensitive to visible light as seen in FIG. 4. Because of this, the device of this invention is quite useful for detecting ultraviolet light, especially when it is present in a background of visible light which inevitably exists in ordinary circumstances.

This invention will be further illustrated by the following Examples 1 to 29.

Example 1

Stannic oxide single crystals having a purity of more than 99.99 percent were prepared by utilizing a vapor-phase reaction between stannic chloride ($SnCl_4$) and water at high temperature. A crystal having an electrical conductivity of about 0.5 ohm$^{-1}$ cm$^{-1}$ was selected from the batch of crystals grown in this way. The crystal was sliced into slabs by using a conventional diamond wheel. Then one of the slabs was ground down to a thickness of about 0.3mm by using lapping powder, and polished on one side to a damage-free flat surface. The slab was cut into chips having a size of about 1 × 1 × 0.3 mm$^3$ by using a diamond scriber. The chips were ultrasonically cleaned with trichloroethylene, followed by acetone and then distilled water to remove adhesive, lapping powder and other contaminants, and then dried in a dust-free chamber. The chips thus cleaned were buried in high purity alumina powder in an alumina boat. The boat was then placed in a conventional electric furnace, and heated at 1,300°C for 8 hours for diffusing aluminum into the surface layer of the chips and making them photoconductive. The photoconductive laminal region thus formed on each chip had a thickness of about 25 microns. Upon completion of the diffusing step, the chips were ultrasonically cleaned with distilled water to remove alumina powder, and dried in the dust-free chamber. After the cleaning, one of the chips was mounted in a vacuum chamber in the form of a glass bell jar. A contact area was defined on the surface of the chip by placing a metal mask having an etch pattern thereover. The bell jar was evacuated to a pressure of the order of 1 × 10$^{-5}$ mm Hg, and then it was backfilled with air to a pressure of the order of 10 mm Hg, and a glow discharge was produced by applying a high electrical voltage to a pair of electrodes placed within the vacuum chamber for the purpose of removing contaminants on the surface of the chip. The glow discharge was continued for about 10 minutes. After the contaminant removal, the bell jar was again evacuated to a pressure on the order of 1 × 10$^{-5}$ mm Hg. A pair of electrodes was formed by depositing a tin film on the contact area of the surface of the chip by a conventional vacuum evaporation technique. Two electrical leads were connected conductively to the respective electrodes by using a silver-dispersed adhesive paste, and the chip was heated at 80°C for 4 hours to cure the paste. The photoconductive device thus fabricated had a construction as shown in FIG. 1. The photoconductive constants of the device are presented in Table 1, i.e., light-resistance, dark-resistance, conductance ratio, conductance sensitivity, and relative change in conductance sensitivity on aging. Light-resistance ($R_L$) and dark-resistance ($R_D$) of the device were measured in the following way: The device was exposed to monochromatic ultraviolet light having a wavelength of 3,400A and having an intensity of 0.1 mW/cm$^2$, and the electrical resistance ($R_L$) was measured on an ohmmeter connected to the device; then the ultraviolet light was cut off and, after 10 seconds, the electrical resistance ($R_D$) of the device was again measured on the ohmmeter. The conductance ratio and conductance sensitivity, which have been defined above, were evaluated on the basis of the values of $R_L$ and $R_D$. After the measurement of $R_L$ and $R_D$ the device was subjected to an aging test; the device was exposed for 200 hours to about 0.2mW/cm $^2$ of ultraviolet light from an UV fluorescent lamp, while there was applied thereto a D. C. voltage of 6 volts. The percent change in conductance sensitivity before and after the aging test was calculated and is presented in the last column of Table 1.

Example 2

A device was fabricated by the same method as in Example 1, except that the electrodes of the device of this Example 2 were subjected to a heat-treatment at 150°C for 1 hour, prior to the step of applying the electrical leads. The photo-conductive constants of the device were measured by the same method as in Example 1, and the data are presented in Table 1.

Example 3

A device was fabricated by the same method as in Example 1, except that the electrodes of the device of this Example 3 were subjected to a heat-treatment at 200°C for 1 hour prior to the step of applying the electrical leads. The photo-conductive constants of the device were measured by the same method as in Example 1, and the data are presented in Table 1.

Example 4

A device was fabricated by the same method as in Example 1, except that the electrodes of the device of this Example 4 were subjected to a heat-treatment at 230°C for 1 hour, prior to the step of applying the electrical leads. The photoconductive constants of the device were measured by the same method as in Example 1, and the data are presented in Table 1.

Example 5

A device was fabricated by the same method as in Example 1, except that the electrodes of the device of this Example 5 were subjected to a heat-treatment at 200°C for 1 hour after the completion of applying the electrical leads. The photoconductive constants of the device were measured by the same method as in Example 1, and the data are presented in Table 1.

Example 6

A device was fabricated by the same method as in Example 1, except that the electrode material of the device of this Example 6 was aluminum. The photoconductive constants of the device were measured by the same method as in Example 1, and the data are presented in Table 1.

Example 7

A device was fabricated by the same method as in Example 1, except that the electrode material of the device of this Example 7 was chromium. The photoconductive constants of the device were measured by the same method as in Example 1, and the data are presented in Table 1.

Example 8

A device was fabricated by the same method as in Example 7, except that, in this Example 8, the chip mounted in the vacuum chamber was heated at 50°C during the application of the chromium electrodes. The photoconductive constants of the device were measured by the same method as in Example 1, and the data are presented in Table 1.

Example 9

A device was fabricated by the same method as in Example 8, except that, in this Example 9, the heating temperature of the chip during the application of the chromium electrodes was 100°C. The photoconductive constants of the device were measured by the same method as in Example 1, and the data are presented in Table 1.

Example 10

A device was fabricated by the same method as in Example 8, except that, in this Example 10, the heating temperature of the chip during the application of the chromium electrodes was 150°C. The photoconductive constants of the device were measured by the same method as in Example 1, and the data are presented in Table 1.

Example 11

A device was fabricated by the same method as in Example 9, except that the electrodes of the device of this Example 11 were subjected to a heat-treatment at 150°C for 1 hour, prior to the step of applying the electrical leads. The photo-conductive constants of the device were measured by the same method as in Example 1, and the data are presented in Table 1.

Example 12

A device was fabricated by the same method as in Example 9, except that the electrodes of the device of this Example 12 were subjected to a heat-treatment at 200°C for 1 hour, prior to the step of applying the electrical leads. The photoconductive constants of the device were measured by the same method as in Example 1, and the data are presented in Table 1.

Example 13

A device was fabricated by the same method as in Example 9, except that the electrodes of the device of this Example 13 were subjected to a heat-treatment at 250°C for 1 hour, prior to the step of applying the electrical leads. The photo-conductive constants of the device were measured by the same method as in Example 1, and the data are presented in Table 1.

Example 14

A device was fabricated by the same method as in Example 9, except for the step of applying electrical leads. The electrical leads of the device of this Example 14 were applied in the following way: Aluminum films were deposited onto the respective electrode by a method of vacuum evaporation, and then an aluminum wire having a diameter of 0.025 mm was ultrasonically bonded to the respective aluminum films. The photoconductive constants of the device were measured by the same method as in Example 1, and the data are presented in Table 1.

Example 15

A device was fabricated by the same method as in Example 14, except that the device of this Example 15 was subjected to a heat-treatment at 250°C for 20 minutes, after the completion of applying the electrical leads. The photoconductive constants of the device were measured by the same method as in Example 1, and the data are presented in Table 1.

Example 16

A device was fabricated by the same method as in Example 1, except that, in this Example 16, the heating temperature and time in the step of making the photoconductive laminal region were 1,100°C and 96 hours, respectively. The thickness of the photoconductive laminal region of the device of this Example 16 was about 8 microns. The photoconductive constants of the device were measured by the same method as in Example 1, and the data are presented in Table 1.

Example 17

A device was fabricated by the same method as in Example 1, except that, in this Example 17, the heating temperature and time in the step of making the photoconductive laminal region were 1,400°C and 8 hours, respectively. The thickness of the photoconductive laminal region of the device of this Example 17 was about 80 microns. The photoconductive constants of the device were measured by the same method as in Example 1, and the data are presented in Table 1.

Example 18

A device was fabricated by the same method as in Example 1, except that the stannic oxide crystal of this Example 18 had a conductivity of about 0.01 $ohm^{-1}$ $cm^{-1}$. The photoconductive constants of the device were measured by the same method as in Example 1, and the data are presented in Table 1.

Example 19

A device was fabricated by the same method as in Example 1, except that the stannic oxide crystal of this Example 19 had a conductivity of about 80 $ohm^{-1}$ $cm^{-1}$. The photoconductive constants of the device were measured by the same method as in Example 1, and the data are presented in Table 1.

Example 20

A device was fabricated by the same method as in Example 1, except that, in this Example 20, the chip of stannic oxide subjected to the diffusing step was heated at 1,250°C for 8 hours in an oxygen atmosphere having a pressure of 10 $kg/cm^2$. The photoconductive constants of the device were measured by the same method as in Example 1, and the data are presented in Table 1.

Example 21

A device was fabricated by the same method as in Example 20, except that, in this Example 21, the heating temperature, heating time, and oxygen pressure in the oxidizing step were 1,200°C, 24 hours and 2 $kg/cm^2$, respectively. The photoconductive constants of the device were measured by the same method as in Example 1, and the data are presented in Table 1.

Example 22

A device was fabricated by the same method as in Example 20, except that, in this Example 22, the heating temperature, heating time and oxygen pressure in the oxidizing step were 1,400°C, 1 hour and 20 kg/cm², respectively. The photo-conductive constants of the device were measured by the same method as in Example 1, and the data are presented in Table 1.

Example 23

A device was fabricated by the same method as in Example 1, except that, in this Example 23, the source of the impurity to be diffused in the step of making the photoconductive laminal region was a fine powder of gallium oxide. The thickness of the photoconductive laminal region of the device of this Example 23 was about 40 microns. The photoconductive constants of the device were measured by the same method as in Example 1, and the data are presented in Table 1.

Example 24

A device was fabricated by the same method as in Example 16, except that, in this Example 24, the source of the impurity to be diffused in the step of making the photoconductive laminal region was a powdered mixture of 80 wt. percent of stannic oxide and 20 wt. percent of indium oxide. The thickness of the photoconductive laminal region of the device of this Example 24 was about 50 microns. The photoconductive constants of the device were measured by the same method as in Example 1, and the data are presented in Table 1.

Example 25

A device was fabricated by the same method as in Example 16, except that, in this Example 25, the source of the impurity to be diffused in the step of making the photoconductive laminal region was a powdered mixture of 80 wt. percent of stannic oxide and 20 wt. percent of cadmium oxide. The thickness of the photoconductive laminal region of the device of this Example 25 was about 20 microns. The photoconductive constants of the device were measured by the same method as in Example 1, and the data are presented in Table 1.

Example 26

A device having a construction shown in FIG. 2 was fabricated in the following way. A stannic oxide chip was prepared by the same method as in Example 1. A paste consisting of fine powder of aluminum hydroxide and distilled water was applied, in the shape of small dot having a diameter of about 0.2mm, to two portions of one flat surface of the chip. After being dried, the chip was heated at 1,300°C for 8 hours for making the photoconductive laminal regions. The thickness of the photoconductive laminal regions of the device of this Example 26 was about 25 microns. Two electrodes were applied to the respective photoconductive laminal regions by the same method as in Example 9, and then two electrical leads were applied to the respective electrodes by the same method as in Example 14. The photoconductive constants of the device were measured by the same method as in Example 1, and the data are presented in Table 1.

Example 27

A polycrystalline body of stannic oxide was prepared by a method similar to that in Example 1. Said body had a purity of more than 99.9 percent and a conductivity of about 100 $ohm^{-1}$ $cm^{-1}$. A platelet having a size of 2 × 2 × 0.5$mm^3$ was prepared from said body by a method similar to that in Example 1. One flat surface of the platelet was brought into contact with a plate consisting of high purity alumina ceramic, and heated at 1,300°C for 10 hours for diffusing aluminum into the surface layer of the platelet. The photoconductive laminal region thus formed on one side of the platelet had a thickness of about 100 microns. A tin electrode was applied to the surface of the photoconductive laminal region by a method similar to that in Example 1. Another electrode was applied to the opposite surface of the platelet by soldering indium. Two electrical leads were applied to the respective electrodes by the same method as in Example 1. The device thus fabricated had a construction as shown in FIG. 3. The photoconductive constants of the device were measured by the same method as in Example 1, and the data are presented in Table 1.

Example 28

A device was fabricated by the same method as in Example 27, except that, in this Example 28, the heating temperature and time in the step of making the photoconductive laminal region were 1,350°C and 16 hours, respectively. The thickness of the photoconductive laminal region of the device of this Example 28 was about 200 microns. The photoconductive constants of the device were measured by the same method as in Example 1, and the data are presented in Table 1.

Example 29

Fifty devices each having tin electrodes were fabricated by the same method as in Example 3 (Group I), and another 50 devices each having chromium-electrodes were fabricated by the same method as in Example 12 (Group II). A histogram with respect to the conductance sensitivity was prepared for the respective groups of the devices, and is presented in Table 2.

TABLE 1

| Ex. | Light-resistance (K ohm) | Dark-resistance (M ohm) | Conductance ratio | Conductance sensitivity ($cm^2ohm^{-1}W^{-1}$) | % change in sensitivity* |
|---|---|---|---|---|---|
| 1 | 15.0 | 15.2 | 1010 | 0.67 | B |
| 2 | 11.0 | 10.5 | 950 | 0.91 | B |
| 3 | 8.2 | 7.0 | 850 | 1.22 | B |
| 4 | 6.3 | 4.4 | 700 | 1.59 | B |
| 5 | 8.5 | 7.0 | 820 | 1.18 | B |
| 6 | 4.4 | 26.0 | 5900 | 2.27 | D |
| 7 | 19.8 | 99.0 | 5000 | 0.55 | C |
| 8 | 14.4 | 46.0 | 3200 | 0.69 | C |
| 9 | 16.5 | 36.4 | 2200 | 0.61 | C |
| 10 | 17.6 | 7.6 | 430 | 0.57 | C |
| 11 | 10.8 | 15.1 | 1400 | 0.93 | C |
| 12 | 8.3 | 8.3 | 1000 | 1.20 | C |
| 13 | 6.5 | 4.2 | 650 | 1.54 | C |
| 14 | 15.3 | 36.8 | 2400 | 0.65 | B |
| 15 | 8.0 | 6.3 | 790 | 1.25 | B |
| 17 | 47.0 | 230 | 4900 | 0.21 | B |
| 16 | 5.4 | 1.7 | 310 | 1.85 | B |
| 18 | 25.5 | 30.5 | 1200 | 0.39 | B |
| 19 | 8.6 | 9.0 | 1050 | 1.16 | B |
| 20 | 14.3 | 20.5 | 1430 | 0.70 | A |
| 21 | 15.5 | 15.8 | 1030 | 0.65 | A |
| 22 | 13.6 | 16.9 | 1240 | 0.74 | A |
| 23 | 21.4 | 17.1 | 800 | 0.47 | B |
| 24 | 27.7 | 7.5 | 270 | 0.36 | C |
| 25 | 6.2 | 1.11 | 180 | 1.60 | C |
| 26 | 16.8 | 23.2 | 1380 | 0.59 | C |
| 27 | 46.5 | 78.3 | 1680 | 0.22 | C |
| 28 | 89.0 | 222 | 2500 | 0.11 | C |

* A — less than 5%
B — 5 to 10%
C — 10 to 20%
D — more than 20%

TABLE 2

| Light-resistance (kilo-ohm) | Frequency (Group I) | (Group II) |
|---|---|---|
| 4–6 | 3 | 0 |
| 6–8 | 15 | 24 |

| | | |
|---|---|---|
| 8–10 | 18 | 23 |
| 10–12 | 8 | 2 |
| 12–14 | 2 | 0 |
| 14–16 | 3 | 0 |
| more than 16 | 1 | 1 |

What is claimed is:

1. A stannic oxide photoconductive device for detecting ultra-violet light, comprising: a stannic oxide body having at least two regions, one of which is a conductive region consisting essentially of stannic oxide, and the other of which is a photoconductive laminal region consisting essentially of stannic oxide and an acceptor impurity; and two electrodes applied to said stannic oxide body, at least one of which is attached to said photoconductive laminal region.

2. A device as claimed in claim 1, wherein said stannic oxide body is in the form of a single crystal.

3. A device as claimed in claim 1, wherein said acceptor impurity is one element selected from the group consisting of aluminum, gallium, cadmium, and indium.

4. A device as claimed in claim 1 wherein said acceptor impurity is aluminum.

5. A device as claimed in claim 1 wherein the thickness of said photoconductive laminal region is not more than 200 microns.

6. A device as claimed in claim 1, wherein the electrical conductivity of said conductive region is more than $10^{-2}$ ohm$^{-1}$ cm$^{-1}$.

7. A device as claimed in claim 1, wherein the electrode applied to said photoconductive laminal region consists essentially of aluminum.

8. A device as claimed in claim 1 wherein the electrode applied to said photoconductive laminal region consists essentially of tin.

9. A device as claimed in claim 1 wherein the electrode applied to said photoconductive laminal region consists essentially of chromium.

10. A method for making a stannic oxide photoconductive device for detecting ultra-violet light, comprising: providing a body of conductive stannic oxide; diffusing an acceptor impurity into at least a portion of the surface layer of said body for making a photoconductive laminal region; and applying two electrodes to said body with at least one of said two electrodes being attached to said photoconductive laminal region.

11. A method as claimed in claim 10, wherein said step of diffusing comprises heating said conductive stannic oxide body in air, while bringing at least a portion of the surface of said body into contact with one oxide selected from the group consisting of aluminum oxide, gallium oxide, cadmium oxide and indium oxide.

12. A method as claimed in claim 10, wherein said step of diffusing comprises heating said conductive stannic oxide body in air, while bringing at least a portion of the surface of said body into contact with aluminum oxide.

13. A method as claimed in claim 11, wherein said heating temperature is in a range from 1,100° to 1,400°C.

14. A method as claimed in claim 10, wherein said step of applying electrodes comprises evaporating and depositing an electrode material onto the surface of said body in an evacuated chamber.

15. A method as claimed in claim 14, wherein said electrode material is aluminum.

16. A method as claimed in claim 14, wherein said electrode material is tin.

17. A method according to claim 16, which further comprises heating said vacuum-deposited tin electrode at a temperature in a range from 150° to 230°C in air.

18. A method as claimed in claim 14, wherein said electrode material is chromium.

19. A method according to claim 18, which further comprises heating said body at a temperature in a range from 50° to 150°C during the vacuum deposition of chromium.

20. A method according to claim 18, which further comprises heating said vacuum-deposited chromium electrode at a temperature in a range from 150° to 250°C in air.

21. A method according to claim 10, wherein said body of stannic oxide subjected to said diffusing step is heated in high pressure oxygen atmosphere.

22. A method as claimed in claim 21, wherein said heating temperature is in a range from 1,200° to 1,400°C.

23. A method as claimed in claim 21, wherein the oxygen pressure is not less than 2 kg/cm$^2$.

* * * * *